April 12, 1960    H. A. DZAACK    2,932,500
WEIGHT RECORDING APPARATUS
Filed Dec. 11, 1956    3 Sheets-Sheet 1

April 12, 1960   H. A. DZAACK   2,932,500
WEIGHT RECORDING APPARATUS
Filed Dec. 11, 1956   3 Sheets-Sheet 2
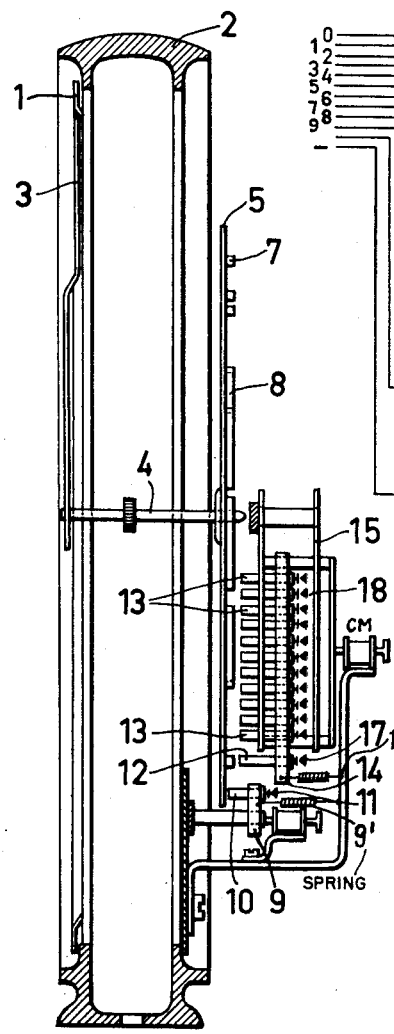
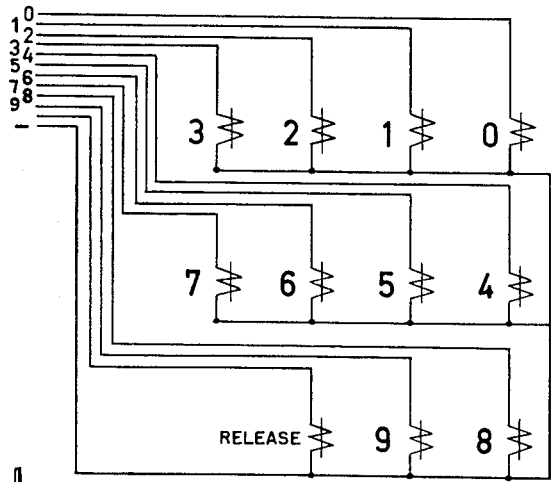
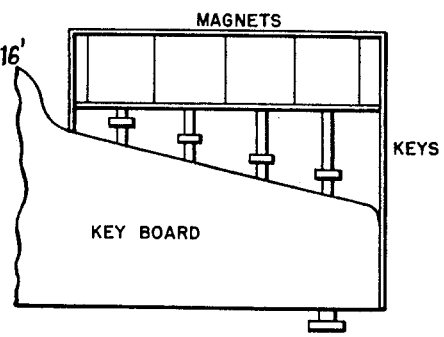
Inventor
H. A. Dzaack
By Glascock Downing Seebold
Attys.

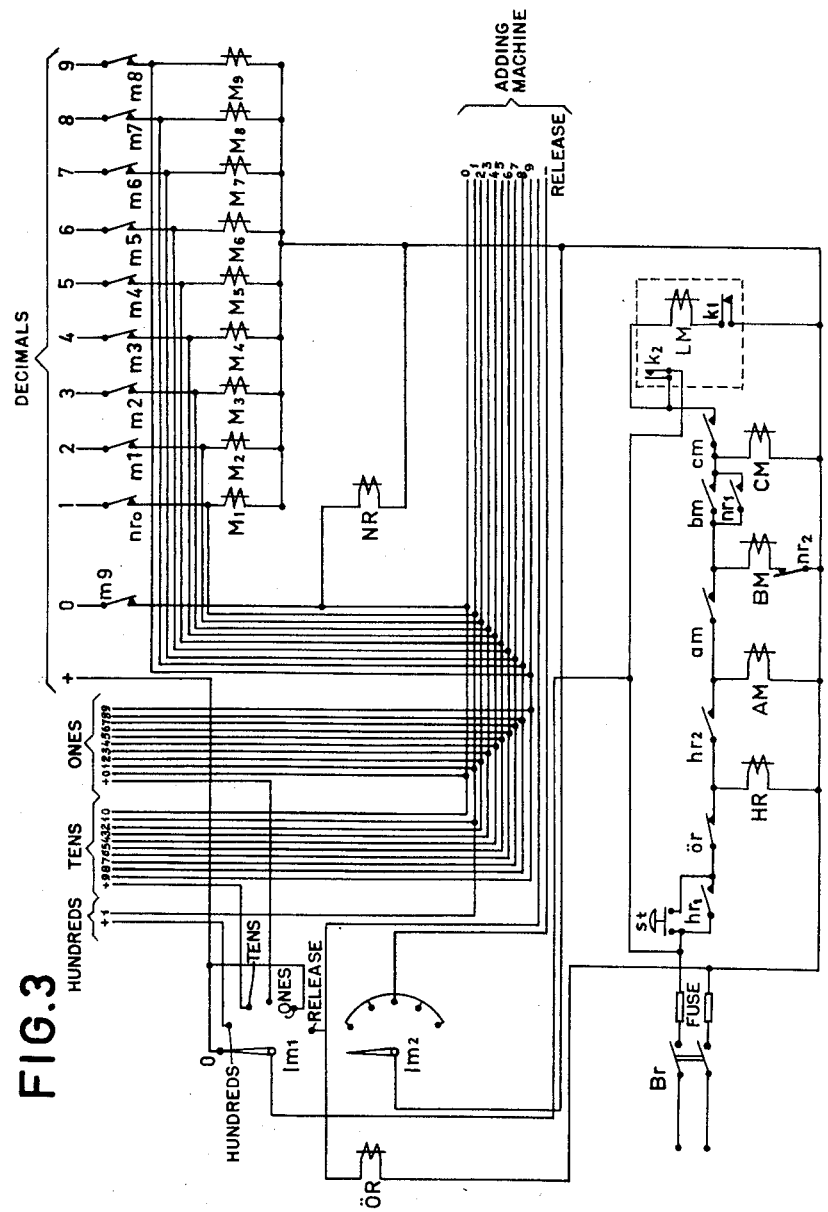

| United States Patent Office | 2,932,500
|---|---|
| | Patented Apr. 12, 1960 |

2,932,500

WEIGHT RECORDING APPARATUS

Heinz Adolf Dzaack, Eskilstuna, Sweden, assignor to Kooperativa Förbundet, Ekonomisk Förening Application December 11, 1956, Serial No. 627,617

Claims priority, application Sweden January 25, 1956

4 Claims. (Cl. 265—5)

Automatic scales are already known in which the weight adjusted is felt by means of mechanical "feelers" which in turn actuate electrical contacts which close corresponding circuits for transmission of the feeling impulses to a recording counter. The disadvantage of the known devices is that the feeling device must be applied and adjusted with a very great accuracy. If the scale indicates, for example exactly 10 kilogrammes, and if the smallest division is 100 grammes, then three weight units will coincide on the line indicating 10 kilogrammes, thus the 10th 100 grammes division, the 10th kilogramme division, and the 1st 10 kilogrammes division. When feeling the 10 kilogrammes position the smallest deviation will result in an error of a whole unit (for example 1 kilogramme).

The present invention relates to a scale or some other measuring device comprising feelers for the feeling members cooperating therewith and provided on a member movable in dependence on the value measured, for determining the position of the last said member and thus also of the value measured and the purpose of the invention is, by means of simple devices, to make possible an exact feeling and recording of the weight or the result of the measuring. The invention is substantially characterized in that the feelers are arranged, in accordance with the feeling, to close circuits to magnets for actuating the recording means, for example of an adding machine, a typewriter, or some other recording machine, and that the feelers for higher units (for example ones, tens, hundreds, et cetera), depending on the position of feelers for lower units (for example decimals), are movable in relation to and in the direction of motion of the said cooperating members, which are shorter in their direction of motion than one division for the respective unit, in such a manner that the relative position of these members and the feelers for the higher units is substantially independent of the number of lower units. The device is preferably of such a kind that the displacement is proportional to the number of decimal units, although it is possible to make such an arrangement that the displacement is zero when at a certain number of decimal units and is increased proportionally to the number of further decimal units. The feeling pins and corresponding members on the feeling disc then can be applied with comparatively great tolerance.

Embodiments according to the invention will hereinafter be described more in detail with reference to the drawings; wherein, Fig. 1 shows a balance head from behind; Fig. 2 shows the same head in side view;

Fig. 3 shows a circuit diagram for the recording device;

Fig. 4 shows the circuit diagram for a common adding machine; and,

Fig. 5 shows the disposition of the pressure magnets on the adding machine.

Figure 1:
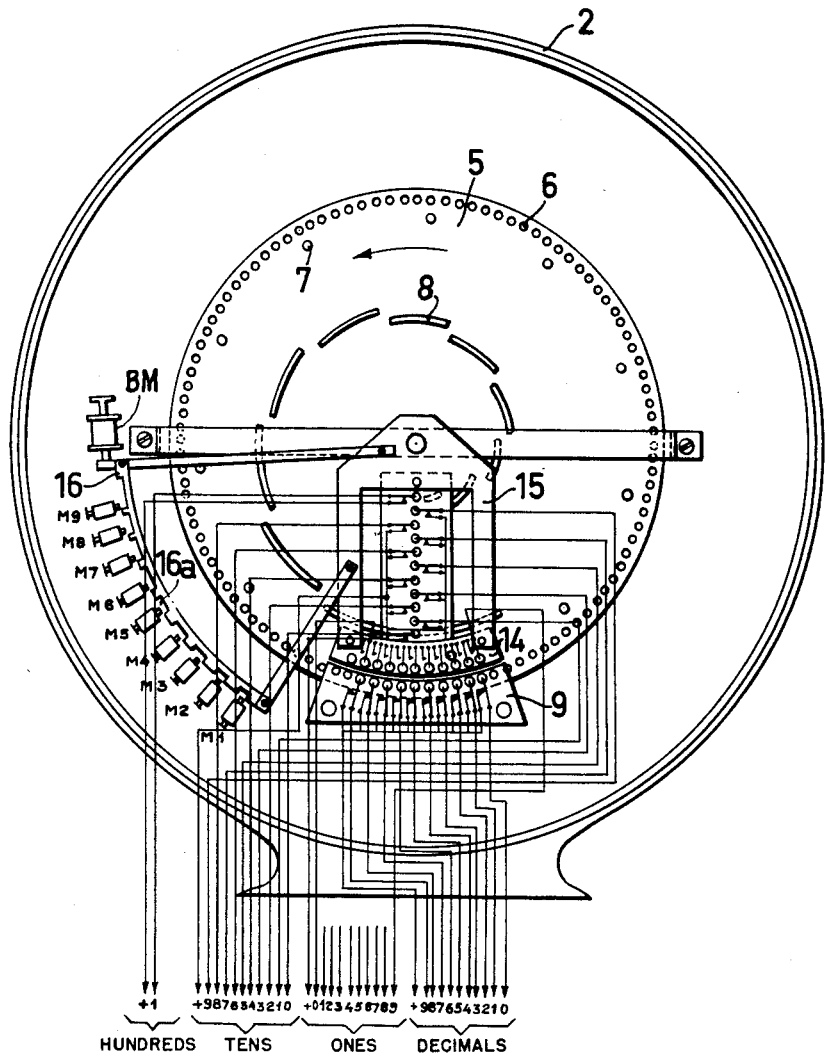

The capacity of the scale is for example 100 kilogrammes.

The graduation on the graduation ring 1 which is fixed to the hood 2 is divided into 100 grames up to 100 kilogrammes. A pointer 3 which is attached to the turnable shaft 4 adjusts itself corresponding to the load of the scale bridge (not shown).

To the other end of the shaft 4 a feeling disc 5 is attached, which is provided with holes 6. The distance between the holes 6 equals the kilogramme division on the dial 1. The holes 6 are arranged to feel the smallest weight units, in this case 100 grammes. For feeling the next higher weight units, thus each kilogramme, elevations 7 are provided on the dial, for example in the form of cylindrical pins. The number of such pins corresponds to the number of next highest weight units, that is, there is one pin for every tenth kilogramme.

For feeling the ten kilogramme units elevations 8 are provided on the dial. The number of such elevations likewise corresponds to the number of ten kilogramme divisions. These elevations, which may be bent bars, each occupy a somewhat smaller angle than a ten kilogramme division. At the end of the series of bars 8 and closer to the center of the disc is a "hundred" bar. The first "tens" bar 8 has been extended through the angle occupied by the "hundreds" bar 8 in order that the "tens" digit 0 shall be registered, when the "hundreds" digit is 1 (maximum value). A movable holder 9 is located exactly opposite the disc 5, so that the pins 10 of the holder 9 can come into contact or engagement with the holes 6 of the disc. The pins 10 are arranged in a vernier relationship to the holes 6 in the disc 5. Thus the distance apart of the pins 10 is 9/10 of the distance apart of the holes 6, so that in the zero position of the disc a hole 6 stands in front of the pin 0, in the 100 gr. position of the disc the next hole 6 is in front of the pin 1, in the 200 gr. position the next hole 6 is in front of the pin 2 etc. When the holder 9 is moved towards the feeling disc 5, one or two pins come into engagement with the holes 6.

The holder 9 is moved by means of a magnet AM, the armature of which is connected to the holder 9. When the magnet AM receives current, the armature of the magnet moves the holder 9 towards the feeling disc 5 and stretches at the same time a spring 9'. When the magnet AM is deenergized, the spring pulls the holder back to its initial position. The pins 10 cooperate each with a pair of contact springs 11. The contact springs 11 for the pins 10 are normally closed, that is, when the holder 9 is pushed towards the disc 5, all contacts of the pins 10 which do not enter holes in the disc are opened.

The elevations 7 and the bars 8 are felt by pins 12 and 13, respectively, for determining the number of kilogrammes and ten kilogrammes respectively. The pins 12 and 13 are mounted in a holder 14, which is movable horizontally in a holder 15 which is pivotally mounted about the same centre as the disc 5 and to which an angular displacement can be imparted by means of a magnet BM. The magnitude of this angular displacement is limited by means of any of the magnets M1–M9 in such a manner that the armatures of the magnets come into engagement with recesses 16a (or elevations) in a segment 16 fixed to the holder 15. Each of these magnets corresponds to a pin 10 in the decimal pin holder. If, for example, the decimal figure 5 is felt, the magnet M5 receives current and is energized, and its armature then constitutes a stop for the motion of the segment 16 and thus for the motion of the holder 15. As will be seen from Fig. 1, these recesses 16a, and thus also the motion of the segment, are of successively differing magnitude, so that the holder 15, through this displacement, at each recording is brought into the same position relatively to the disc 5, independently of the decimal number, preferably the position assumed, when whole kilogrammes are felt, that is, the decimal number 0. Thus, one of the pins 12 of the holder 14, at each feeling operation, will be located exactly opposite one of the elevations 7, so that only one unit figure can be felt.

The angular distance from the end of a bar 8 to the beginning of the next bar may equal the kilogramme division. One bar begins for example at 10.0 and ends at 19.0. The next bar begins for example at 20.0 and ends at 29.0 et cetera. When for example 19.9 kilogrammes are to be felt, the holder 15 and thus also the holder 14 will be moved 9/10 of a division (equal with the kilogramme division) so that it assumes the same position in relation to the disc, as when 19.0 kilogrammes are felt. Owing to this only one ten number can be felt.

The holder 14 with the pins 12 and 13 is moved by means of the magnet CM, the armature of which is connected to the holder 14. When the magnet CM receives current, the armature of the magnet pushes the holder 14 towards the feeling disc 5 and stretches at the same time a spring 16', which, when the magnet CM becomes currentless, moves the holder back to its initial position. The pins 12 and 13 cooperates with corresponding pairs of contact springs 17 and 18 respectively, which normally are open.

In certain positions of the disc 5 two consecutive decimal pins, as can easily be seen, will go through holes in the disc when the magnet AM is energized. Yet, in order that only one of the wires connected to the contacts of these pins shall transmit an impulse to the adding machine or the like the magnets NR, M1–M9 are provided with normally closed contacts nr0, m1–m9 (Fig. 3), which are opened when the respective magnet is energized, and which, with a displacement of one step, are inserted in the wires from the decimal pins to the respective magnets, so that, when two of these wires, for instance 3 and 4, receive voltage, solely the magnet corresponding to the first of these wires, in this case the magnet M3, is energized and thereby permits an impulse to reach the magnet 3 of the adding machine.

The contact selector LM is of a well-known construction, for example made as a line finder of telephone exchanges. The feeding from contact to contact is carried out by means of a magnet (not shown), which when there is current (or interruption of current) feeds the feeling arms stepwise forwards via the armature and a toothed wheel. The selector makes one revolution for each recording. The contact $K_1$ is an automatic interrupter and brings about the stepwise feeding. The contact $K_2$ breaks the circuit, when the contact arms reach the zero position, whereby the selector stops.

Those magnets that give a pressure impulse to the keys of the adding machine are preferably placed directly above the buttons of the keys (Figs. 4 and 5).

The mode of operation is as follows:

Zero position, that is, the scale bridge is not loaded. The recording shall indicate zero. The main switch $B_r$ is closed. When the start button $St$ is pressed, the relay HR is energized through a circuit consisting of +, the contact $St$, the contact $\ddot{o}r$, the relay HR, —. When HR is closed, hr1 and hr2 are closed. The relay HR holds itself over the contact hr1. The magnet AM receives current over hr2. The magnet AM is energized and pushes the pin holder 9 towards the feeling disc 5. Of the decimal pins 10 of the pin holder 9 the zero pin comes into engagement with the corresponding hole 6 in the feeling disc, and the contact 11 at the zero pin remains closed. The other pins engage the feeling disc and the corresponding contacts 11 are opened. The relay NR receives current over a circuit consisting of +, the arm lm1, the contact 0, the + wire to the contact 11 of the zero pin, the wire 0, the relay NR, —. When the relay NR is closed, its contact nr2 breaks the circuit for the magnet BM, for when feeling the decimal digit zero, the holder 15 shall remain in the zero position. The contact nr1 closes the circuit to the magnet CM, which is energized and pushes the pin holder 14 towards the feeling disc 5. The unit pin 12 (the zero pin) now closes its contact 17 and the tens pin 13 (the zero pin) closes its contact 18. The contact selector LM receives current over the contact cm and feeds its contact arms lm1 and lm2 forwards. The wiper contact arm lm1 is sequentially stepped over the stationary contacts "hundreds," "tens," "ones," "decimals" and "release."

The arm lm2 closes the minus line to the adding machine. When the arm lm1 of the selector engages the contact "hundreds," the line 1 to the adding machine cannot receive current, since the "hundreds" pin does not stand on its feeling bar 8 (see Fig. 1) and the corresponding contact 18 thus is open. When the arm lm1 of the selector engages the contact "tens," the circuit is closed from : +, the arm lm1, the contact "tens," the + wire to the contact 18 (the zero pin), the wire 0 to the magnet 0 of the adding machine, the minus wire, the arm lm2, —. The magnet 0 of the adding machine is energized and depresses the key 0 of the adding machine.

When the arm lm1 of the selector engages the contact "ones," the circuit is closed from: +, the arm lm1, the contact "ones," the + wire to the contact 17 (the zero pin), the wire 0 to the magnet 0 of the adding machine, the minus wire, the arm lm2, —. The magnet 0 of the adding machine is energized and depresses the key 0 of the adding machine.

When the arm lm1 of the selector engages the contact "decimals," the circuit is closed from: +, the arm lm1, the contact "decimals," the + wire to the contact 11 (the zero pin), the wire 0 to the magnet 0 of the adding machine, the minus wire, the arm lm2, —. The magnet 0 of the adding machine is energized and depresses the key 0 of the adding apparatus. When the arm lm1 of the selector engages the contact "release," the circuit is closed from: +, the arm lm1, the contact "release," the wire to the magnet "release" of the adding machine, the minus wire, the arm lm2; —. The magnet "release" is energized, whereby the adding machine registers 00.0.

At the same time as the wiper arm lm1 is in position "release" the circuit is closed from: +, the arm lm1, the contact "release," the relay ÖR, —. The relay ÖR is energized and opens the contact ör, whereby the relay HR becomes deenergized and opens the contacts hr1 and hr2, whereby the whole system becomes currentless. The recording is completed and a new recording operation can begin, as the arm lm1 of the selector stepping relay LM is in its initial position (contact 0).

If the weight is for example 47.5 kilogrammes the pointer 3 has assumed a position pointing against 47.5 kilogrammes on the dial 1. The feeling disc 5 has also assumed that position. When the feeling operation starts, and the pin holder 9 has been moved towards the disc, the course of recording is as follows:

Decimal: The fifth decimal pin 10 is in engagement with a hole 6. The corresponding spring contact of this pin is closed and a circuit is completed from +, the arm lm1, the contact 0, the + wire to the contact 11, the wire 5, the magnet M5, —. The magnet M5 is energized and its armature now constitutes a stop for the motion of the segment 16. The magnet BM receives current over the contact am and is energized, whereby the segment 16 and thus the holder 15 is moved against the stop consisting of the armature of the magnet M5. When BM is energized, the contact bm is closed, over which the magnet CM receives current and is energized, whereby the holder 14 is pushed towards the feeling disc 5.

"Ones": The seventh pin stands on the feeling pin 7 of the disc 5 and the corresponding contact 17 is closed.

"Tens": The fourth pin 13 stands against the corresponding feeling bar 8 of the disc 5, and the corresponding contact 18 is closed.

The contact selector LM receives current over closed contacts *cm* and feels:

The contact "hundreds," but the pin for "hundreds" does not stand on its feeling bar. Thus, the corresponding contact 18 is open and no closed circuit is obtained.

The contact "tens": +, the arm *lm*1, the contact "tens," the + wire to the pin 4, the contact 18, the wire 4 to the magnet 4 of the adding machine, the minus wire, the arm *lm*2, —. The magnet 4 is energized and depresses the key 4 of the adding machine.

The contact "ones": +, the arm *lm*1, the contact "ones," the + wire to the contact 17 of the pin 7, the wire 7 to the magnet 7 of the adding machine, the minus wire, the arm *lm*2, —. The magnet 7 is energized and depresses the key 7 of the adding machine.

The contact "decimal": +, the arm *lm*1, the contact "decimal," the + wire to the contact 11 of the pin 5, the wire 5 to the magnet 5 of the adding machine, the minus wire, the arm *lm*2, —. The magnet 5 is energized and depresses the key 5 of the adding machine.

The contact "release": As described above. The result of the recording: 47.5 kilogrammes.

Instead of the embodiment now described, in which the holder 15 and thus the holder 14, is movably mounted in the same centre as the disc 5, the holder 15 may be fixedly mounted. Then the holder 9 is mounted movably about the centre of the disc 5 and the segment 16 is attached to the holder 9. When the pins 10 of the holder 9 have come into engagement with the disc 5, the holder 9 and thus the disc 5, which now is in engagement with the holder through the pins 10, is moved, in the same manner as the holder 15 was moved before, although the motion is in the opposite direction, whereafter the holder 14 is moved towards the disc 5 in the same way as before.

Feeling and recording are then carried out in the same manner as described above.

Instead of bringing about the displacement by means of a magnet BM and limiting the displacement by means of the magnets M1–M9 the magnet BM may be dispensed with and the magnets M1–M9 may be arranged to actuate the segment 16 or a corresponding member, so that these magnets themselves carry out the displacement in the manner described.

Obviously numerous variations and modifications of the instant invention are possible in the light of the above teachings. Accordingly, it is to be understood that within the scope of the appended claims the invention may be practiced otherwise than as specifically described herein.

What I claim is:

1. A system for transmitting the weight indication of a weighing apparatus to a key-operable recording machine comprising a disc pivotally mounted on the weighing apparatus, said disc being angularly displaced correlative to the weight indication of the weighing apparatus, a plurality of equidistantly spaced apertures concentrically arranged on said disc and representing a first unit of weight values, a first plurality of equidistantly spaced protuberances concentrically arranged on said disc and representing a second unit of weight values, said second unit values being a preselected multiple of said first unit values, a third plurality of arcuate shaped protuberances spirally arranged on said disc and representing a third unit of weight values, said third unit values being a preselected multiple of said second unit values, a first plurality of normally closed circuit closure means, a movable holder for said first plurality of circuit closure means normally maintaining them in spaced confronting relation to the apertures in the disc, means for selectively moving the holder toward the disc to open all the circuit closure means not in registration with an aperture, a second plurality of normally open circuit closure means, one of which is adapted to be closed by engagement with the one of said protuberances of the first plurality corresponding to the second unit value of the weight indication, a third plurality of normally open circuit closure means, one of which is adapted to be closed by engagement with the one of said arcuate shaped protuberances corresponding to the third unit value of the weight indication, a pivoted holder for said second and third plurality of circuit closure means, said pivoted holder being angularly displaced from an initial position to a moved position governed by the closed one of said first plurality of circuit closure means whereupon operational engagement between said second and third circuit closure means and the protuberances of the first plurality and the arcuate shaped protuberances is respectively effected, means for sequentially energizing the circuit closed by each of said first, second, and third plurality of circuit closure means, and means responsive to the energization of said circuit for actuating the key of the recording machine corresponding to the closed ones of said circuit closure means.

2. A system according to claim 1 including means for reestablishing the initial condition of the system subsequent to the actuation of the keys of the recording machine.

3. A system according to claim 1 including electromagnetic means for effecting movement of the holder of said first plurality of circuit closure means toward the disc, second electromagnetic means for effecting angular displacement of the holder of said second and third plurality of circuit closure means and third electromagnetic means for effecting operational engagement between said second and third circuit closure means and said proturberances of the first plurality and arcuate shaped protuberances respectively, subsequent to the angular displacement of the holder.

4. A system according to claim 1 including an arcuate shaped member secured to said pivoted holder, a plurality of recesses of unequal length in the direction of movement of said holder and formed in said member, and electromagnetic means responsive to said closed one of said first plurality of circuit closure means for selective association with one of said recesses to regulate the angular displacement of said pivoted holder.

References Cited in the file of this patent

UNITED STATES PATENTS

| | | |
|---|---|---|
| 2,092,957 | Cuenoud | Sept. 14, 1937 |
| 2,116,086 | Van Berkel | May 3, 1938 |
| 2,577,820 | Singleton | Dec. 11, 1951 |
| 2,780,201 | Dzaack | Feb. 5, 1957 |